(12) United States Patent
Dake et al.

(10) Patent No.: US 9,026,864 B2
(45) Date of Patent: May 5, 2015

(54) OFFLOADING HEALTH-CHECKING POLICY

(75) Inventors: Steven Charles Dake, Scottsdale, AZ (US); Russell Andrew Bryant, Charleston, SC (US)

(73) Assignee: Red Hat, Inc., Raleigh, NC (US)

( * ) Notice: Subject to any disclaimer, the term of this patent is extended or adjusted under 35 U.S.C. 154(b) by 158 days.

(21) Appl. No.: 13/408,144

(22) Filed: Feb. 29, 2012

(65) Prior Publication Data
US 2013/0227355 A1    Aug. 29, 2013

(51) Int. Cl.
*G06F 11/00* (2006.01)
*G06F 11/07* (2006.01)

(52) U.S. Cl.
CPC ........ *G06F 11/0709* (2013.01); *G06F 11/0781* (2013.01)

(58) Field of Classification Search
CPC ............ G06F 11/0781; G06F 11/0709; G06F 11/3003; G06F 11/0703; G06F 11/0706
USPC .......................................................... 714/48
See application file for complete search history.

(56) References Cited

U.S. PATENT DOCUMENTS

| | | | |
|---|---|---|---|
| 5,960,170 A * | 9/1999 | Chen et al. ................. | 714/38.14 |
| 8,122,282 B2 * | 2/2012 | Betzler et al. .................. | 714/4.1 |
| 8,413,146 B1 * | 4/2013 | McCorkendale et al. ........ | 718/1 |
| 2005/0216759 A1 * | 9/2005 | Rothman et al. .............. | 713/200 |
| 2007/0260939 A1 * | 11/2007 | Kammann et al. .............. | 714/48 |
| 2010/0306849 A1 * | 12/2010 | Zheng et al. .................... | 726/24 |
| 2011/0208841 A1 * | 8/2011 | Robertson et al. ............ | 709/220 |
| 2011/0314339 A1 * | 12/2011 | Daily et al. ..................... | 714/37 |
| 2013/0227335 A1 * | 8/2013 | Dake et al. ..................... | 714/4.2 |

* cited by examiner

*Primary Examiner* — Yair Leibovich
(74) *Attorney, Agent, or Firm* — Lowenstein Sandler LLP

(57) ABSTRACT

Methods and systems for offloading health-checking policy in a distributed management environment are provided. A failure policy is received at a node of a cloud from a cloud health monitor. The node transmits a notification to a health monitor of the node that the node has failed when the failure policy is satisfied. The node reports at least one fault based on the satisfied failure policy to the cloud health monitor.

16 Claims, 4 Drawing Sheets

OFFLOADING HEALTH-CHECKING POLICY

TECHNICAL FIELD

Embodiments of the present invention relate to distributed management environments including cloud computing systems, and more specifically, to a method and apparatus for offloading health-checking policy in a distributed management environment.

BACKGROUND

Cloud computing is the provision of dynamically scalable and often virtualized resources as a service over the Internet on a utility basis. Users need not have any knowledge of, expertise in, or control over the technology infrastructure in the "cloud" that supports them. Cloud computing services often provide common business applications online that are accessed from a web browser, while the software and data are stored on servers.

Cloud computing customers do not generally own the physical infrastructure serving as host to the software platform in question. They typically consume resources as a service and pay only for resources that they use. The majority of cloud computing infrastructures typically include services delivered through data centers and built on servers with different levels of virtualization technologies. The services are accessible from various locations that provide access to networking infrastructure. Clouds often appear as single points of access for all consumers' computing needs.

Cloud computing is quickly becoming the platform of choice for businesses that want to reduce operating expenses and be able to scale resources rapidly. Eased automation, flexibility, mobility, resiliency, and redundancy are several other advantages of moving resources to the cloud. On-premise private clouds permit businesses to take advantage of cloud technologies while remaining on a private network. Public clouds permit businesses to make use of resources provided by third party vendors. Hybrid clouds permit the best of both public and private cloud computing models. Many organizations are being introduced to cloud computing by building an on-premise Infrastructure-as-a-Service (IaaS) cloud, which delivers computing, storage, and networking resources to users. Some organizations utilize cloud computing technology in an evolutionary way that leverages and extends their existing infrastructure and maintains portability across different technology stacks and providers.

One or more physical host machines or virtual machines (VMs) may be employed in a cloud (hereinafter referred to as "nodes"). For VMs, each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way.

High availability, when applied to computer systems in general and cloud computing systems in particular, refers to the application of well-known techniques to improve availability (A) as defined by the equation $A=MTBF/(MTTR+MTBF)$, where MTTR refers to mean time to recovery and MTBF refers to mean time between failures. MTBF is the predicted elapsed time between inherent failures of a system during operation. MTTR is the average time that a device may take to recover from any failure. Reducing MTTR may include the automation of manual operations of activities such as, but not limited to, fault detection, fault isolation, fault recovery, and administrative repair.

For software, increasing MTBF may include, but is not limited to, technical source code reviews, high quality automated validation, minimizing complexity, and employing software engineers having a mixture of levels of experience. For hardware, increasing MTBF may include, but is not limited to, using higher quality components, preemptively replacing hardware components prior to predicted wear out, and employing a sufficient burn in period to remove infant mortalities from a product delivery stream.

In current cloud computing systems, a management component of the cloud computing system typically polls for data concerning the health of managed components from one centralized location. These managed components may be nodes which may include one or more virtual machines in a network infrastructure. The centralized management component may periodically poll a node for state information, such as how much memory is consumed, how much disk space is consumed, the system load, or other details over the network. The management component then applies a policy to detect if a node is faulty, (e.g., the memory consumed is greater then 98%) based on data returned by the node.

Periodically polling nodes for state information and having a node transmit back to the management component state results may consume significant network resources and slow the time required to detect a failure. The slower detection time results in a higher MTTR and results in lower availability.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for offloading health-checking policy in a distributed management environment are described herein. In one embodiment, a node (e.g., a physical host machine, a virtual machine or VM running on a host machine, or a collection of virtual machines (i.e., a deployable) running on a host machine) of a cloud receives a failure policy from a cloud health monitor (e.g., of a cloud controller). The failure policy may be received at startup/initialization of the node or at a later date and time. The failure policy may be based on a state of the node. The failure policy is a descriptor of system state that must be in bounds. The failure policy is one or more system statistics as a component for equation testing, including, for example, memory or CPU usage and system load. The failure policy may be at least one configuration containing one or more policy equations applicable to all nodes/in the cloud or to a particular node.

The node then transmits a notification to a health monitor of the node that the node has failed when the failure policy is satisfied. The node reports at least one fault based on the satisfied failure policy to the cloud health monitor. The node may mark itself as failed and indicate it is faulty through its fault notification mechanisms. As a result, the fault is reported to the cloud health monitor without the latter polling for each individual metric.

Policy decision execution is offloaded into the network node, while the activity of deciding the policy still occurs in the central management system. This mitigates network consumption problems and reduces MTTR (which improves availability) by permitting very fast metric gathering using the CPU speed of a locally managed node without involving the network to transmit the data using network speed (which is 100,000's times slower). As a result, availability improves and significant network resource utilization is reduced.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
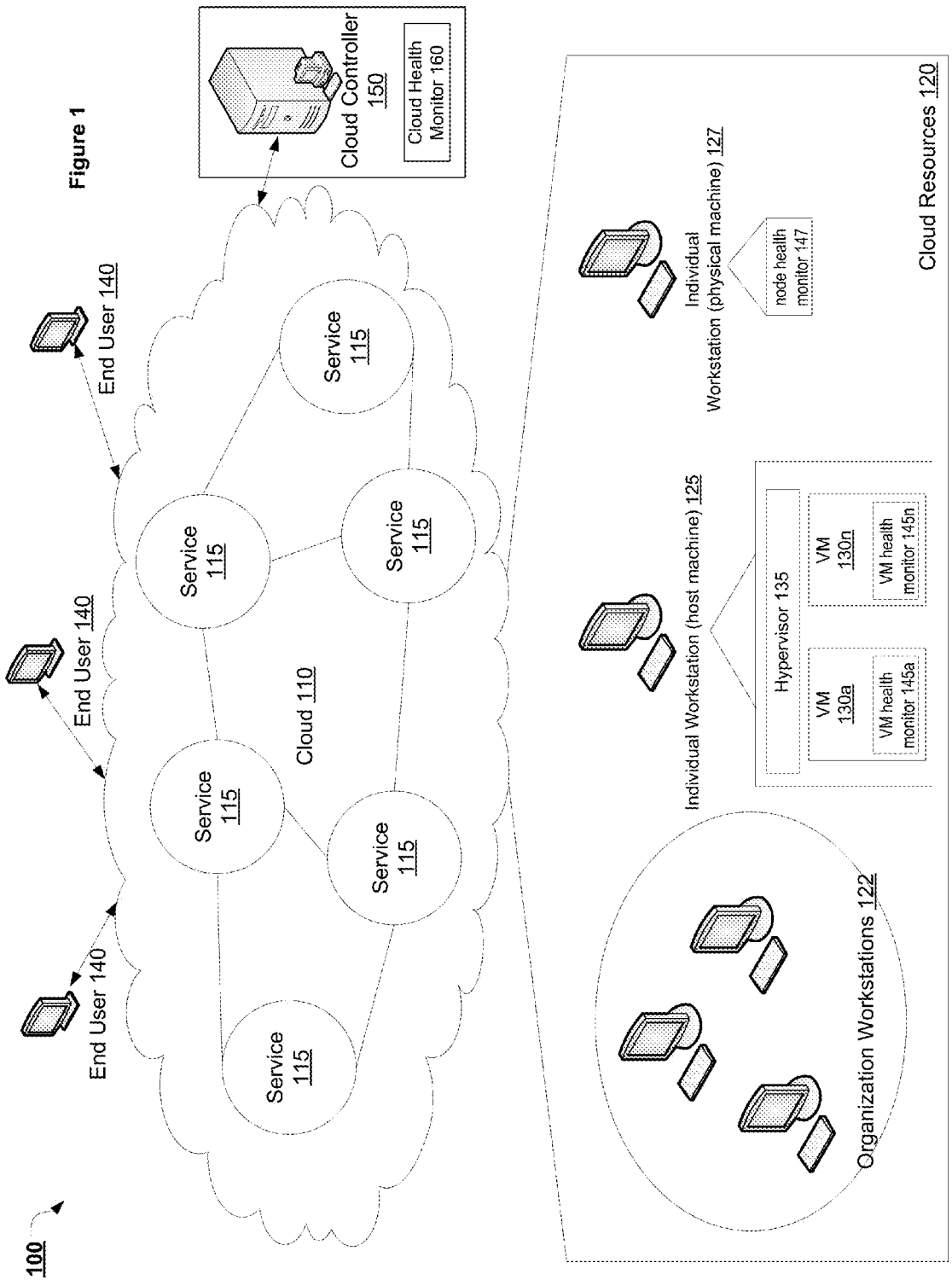
FIG. 1 illustrates an exemplary distributed management environment (e.g., a cloud) in which embodiments of the present invention may operate.

FIG. 1 illustrates an exemplary distributed management environment 100 in which embodiments of the present invention may operate. The distributed management environment 100 may be, but is not limited to, a cloud 110 comprising dynamically scalable and virtualized resources used to provide services 115 over the Internet. One or more end users 140 may access and utilize the services 115 via client devices without having to maintain dedicated hardware on their end. In one embodiment, a cloud controller 150 is provided to manage the resources and services of the cloud 110. In some embodiments, a host controller 125 may reside on a designated computer system (e.g., a server computer, a desktop computer, etc.) or be part of a host machine 125 or another machine.

As illustrated, a break-out box of the cloud 110 shows the actual cloud resources 120 including hardware that may be employed by embodiments of the invention as computing resources of the cloud 110. In one embodiment, one or more organized workstations 122 or host machines 125 may be utilized to execute a plurality of virtual machines (VMs) 130a-130n (i.e., the nodes 130a-130n) that may be used as cloud computing resources. In embodiments of the invention, each host machine 125 is capable of running one or more virtual machines (VMs) 130a-130n. Each of the VM s 130a-130n runs a guest operating system (OS) that may be different from one another. The guest OS may include Microsoft Windows, Linux, Solaris, etc. The host machine 125 may include a hypervisor 135 that emulates the underlying hardware platform for the VMs 130a-130n. The hypervisor 135 may also be known as a virtual machine monitor (VMM), a kernel-based hypervisor, or a host operating system. In one embodiment, each of the VM 130a-130n may be accessed by one or more of clients over a network (not shown). The network may be a private network (e.g., a local area network (LAN), wide area network (WAN), intranet, etc.) or a public network (e.g., the Internet).

In another embodiment, one or more organized workstations 122 or physical machines 127 (i.e., the nodes 127) may be utilized directly as cloud computing resources.

In one embodiment, a cloud health monitor 160 of the cloud controller 150 is configured to oversee, offload, and distribute a failure policy to health monitoring components of nodes (i.e., the VMs 130a-130n, the deployables 230 (not shown in FIG. 1; see FIG. 2), and the physical machines 147) of a cloud 110 (e.g., the corresponding VM health monitors 145a-145n, the collection of VMs health monitors 235 of FIG. 2 described below, and the node health monitors 147, respectively).

A node health monitor (e.g., 145a) is configured to transmit a notification from the node (e.g., the VM 130a) that the node has failed when the failure policy is satisfied. The node health monitor (e.g., 145a) that has receive a notification of a failure from a node (e.g., the VM 130a) based on the satisfied failure policy reports the failure to the cloud health monitor 160 of the cloud controller 150 of the cloud 110.

Figure 2:
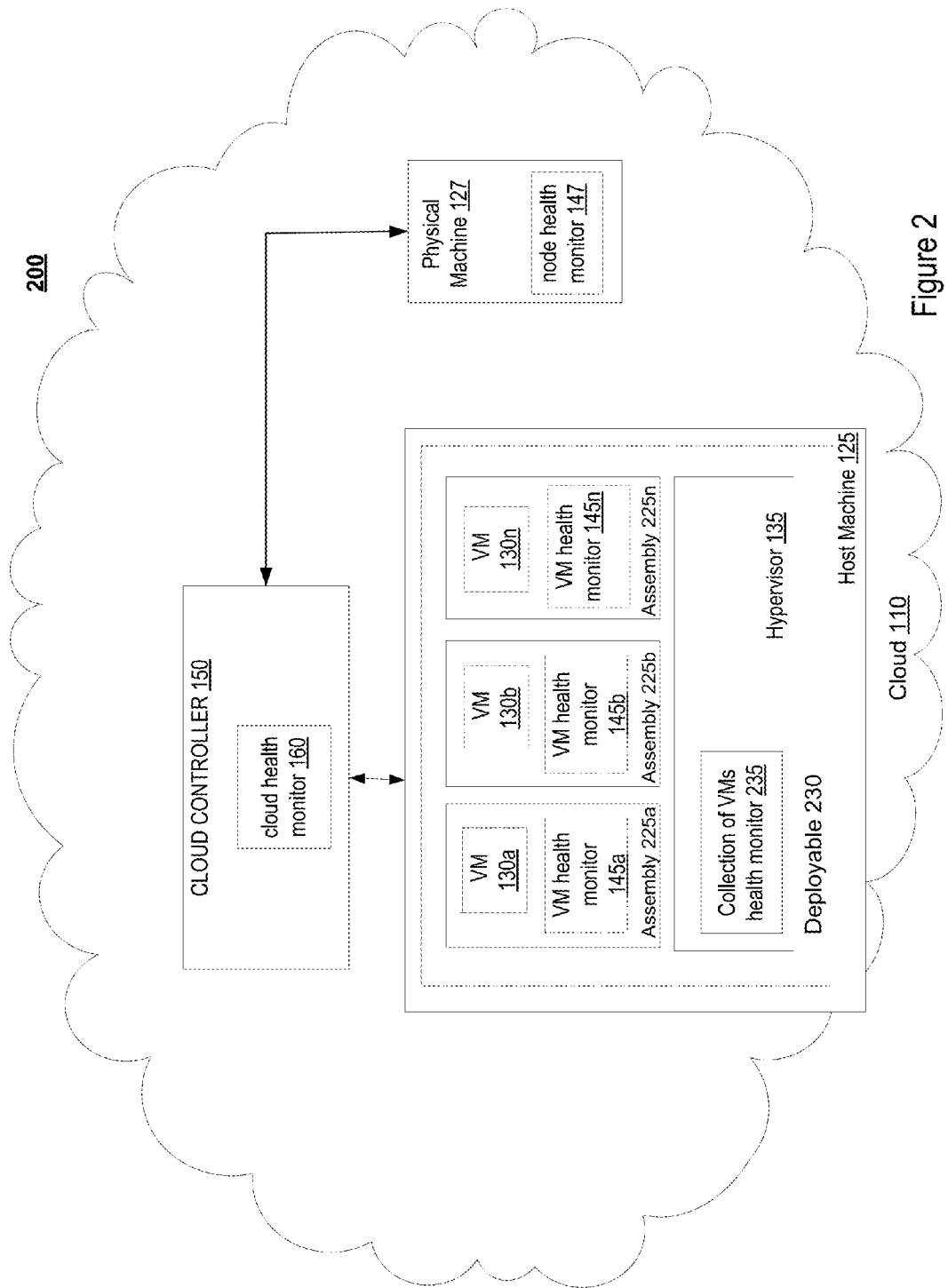
FIG. 2 illustrates a cloud computing architecture for offloading health-checking policy in which embodiments of the present invention may operate.

FIG. 2 illustrates a cloud computing architecture 200 for offloading health-checking policy in which embodiments of the present invention may operate. The computing architecture 200 includes the cloud 110. The cloud 110 may be private, public, hybrid, internal, or external. The cloud 110 may be part of an enterprise cloud computing solution produced by, but not limited to, Red Hat (Cloud Forms), Abiquo, BMC, CA, Cloud.com, Dell, Enomaly, Eucalyptus, Hexagrid, HP, IBM, Microsoft, Platform Computing, Tibco, and VMWare.

Each cloud is managed by a cloud controller 150. In one embodiment, the cloud controller 150 is part of an enterprise virtualization solution. The cloud 110 may include one or more physical machines 127. In one embodiment, individual applications (not shown) may be instantiated, started, and executed on one or more of the individual physical machines 127. The one or more physical machines may each include an active node health monitor (e.g., 147) which is configured to apply a failure policy and to receive health status of the physical machine (e.g., 127) internally.

The cloud 110 may include one or more host machines 125, each including a hypervisor 135 configured to virtualize the resources of the host machine 125 for the execution of one or more VMs 130a-130n. In one embodiment, individual applications (not shown) may be instantiated, started, and executed on one or more of the individual VMs 130a-130n. The VMs 130a-130n may be grouped into corresponding assemblies 225a-225n. An assembly (e.g., one of 225a-225n) may include a virtual machine (e.g., one of 130a-130n) plus an active node health monitor (e.g., one of 145a-145n) which is configured to apply a failure policy and to receive health status of the virtual machine (e.g., one of 130a-130n) internally. One or more of the assemblies 225a-225n may be grouped into a deployable 230. In one embodiment, a deployable 230 may be defined as a collection of assemblies 225a-225n (e.g., the individual VMs 130a-130n, their corresponding hypervisor 135, plus an active node health monitor (e.g., a collection of virtual machines (VM) health monitor 235 within the hypervisor 135), configured to apply a failure policy and to receive health status of the collection of VMs 130a-130n internally. Although FIG. 2 depicts one deployable 230 mapped to one hypervisor 135, in another embodiment, multiple deployables 230 may run on one hypervisor 135.

As used herein, a failure policy is a descriptor of system state that must be in bounds. When operating out of bounds, the policy will indicate a failure. A failure policy may include an individual policy or multiple policies, for example:
If memory consumption>95%→fail
If cpu utilization>90%→fail
if disk usage>95%→fail These individual policies may be combined to form a failure policy. The failure policy may be stored in the cloud controller's data storage (not shown), and may be transmitted to a monitoring component on initialization.

Finally, the cloud controller 150 may include a cloud health monitor 160 configured to apply a failure policy and to receive health status of one or more nodes 127, 130a-130n, 230, internally. In response to a transmission of a failure policy to one or more nodes 127, 130a-130n, 230 at system startup, when one or more failure criteria corresponding to the failure policy are reached by internal monitoring components of a node 127, 130a-130n, 230, the node 127, 130a-130n, 230 may asynchronously report a failure status to a corresponding health monitor component 145a-145n, 147, 235, 160, respectively. The node 127, 130a-130n, 230 may then mark itself as failed.

In an embodiment, a high availability cloud service is operable to deliver maximum application service availability for a node 127, 130a-130n, 230. This is achieved by the detection and recovery of failures in any of the following components: monitored applications (not shown), physical machines 127, assemblies 225a-225n, and deployables 230. Recovery from a detected failure may require terminations of components of a physical machine 127, an assembly 225a-225n, or a deployable 230. The restarting of components is controlled by the cloud health monitor 160, the collection of VMs health monitor 235, or the individual node monitors 145a-145n, 147, 235.

Figure 3:
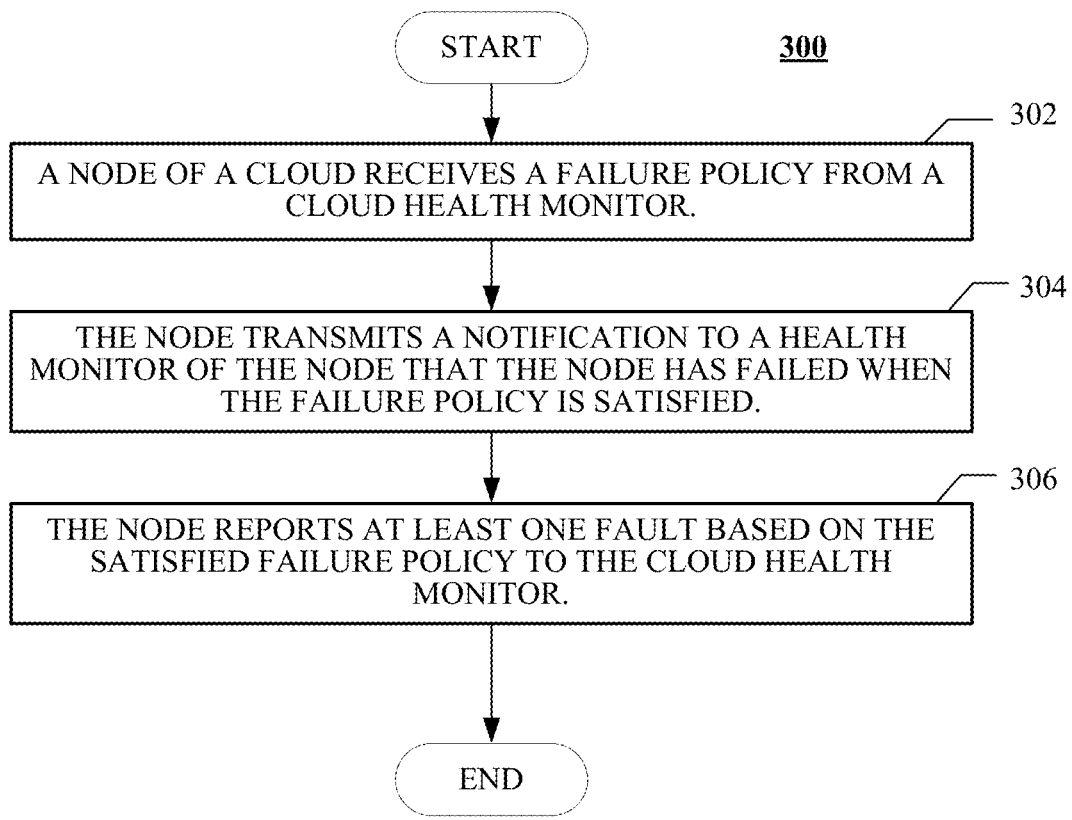
FIG. 3 is a flow diagram illustrating one embodiment of a method for offloading health-checking policy in a distributed management environment.

FIG. 3 is a flow diagram illustrating one embodiment of a method 300 for offloading health-checking policy in a in a distributed management environment. Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof.

At block 302, a node 145a-145n, 147, 230 of a cloud receives a failure policy from a cloud health monitor (e.g., 160). In FIG. 2, the node 145a-145n, 147, 230 may receive the failure policy at startup/initialization of the node 145a-145n, 147, 230 or at a later date and time from, for example, the cloud health monitor 160. The failure policy may be based on a state of the node 145a-145n, 147, 230 including, for example, memory or CPU usage and system load. In one embodiment, the failure policy may be a configuration containing one or more policy equations applicable to all nodes 145a-145n, 147, 230 in the cloud 110 or to a particular node 145a-145n, 147, 230. In another embodiment, the failure policy may not be an equation but an out of band operation of an on-system command to check the health of the system. More generally, a failure policy may include any type of system statistic as a component for equation testing, even those that may not yet exist or are exported from the system.

One example of a set of failure policy equations sent to managed node 130a on system start-up may be as follows:
a) memory>98% usage
b) system load>6 && memory>98% usage At block 304, the node (e.g., the VM 130a) transmits a notification to a health monitor of the node that the node has failed when the failure policy is satisfied. At block 306, the node (e.g., the VM 130a) reports at least one fault based on the satisfied failure policy to the health monitors (e.g., one or more of the health monitors 145a-145n, 147, 235, 160). The node (e.g., the VM 130a) may mark itself as failed and indicate it is faulty through its fault notification mechanisms. Fault notification mechanisms may include, but not limited to, a bus-based QPID architecture, a simple TCP connection, a REST interface, or any other multi-system transport mechanism. As a result, the fault is reported to the management component without the latter polling for each individual metric.

Figure 4:
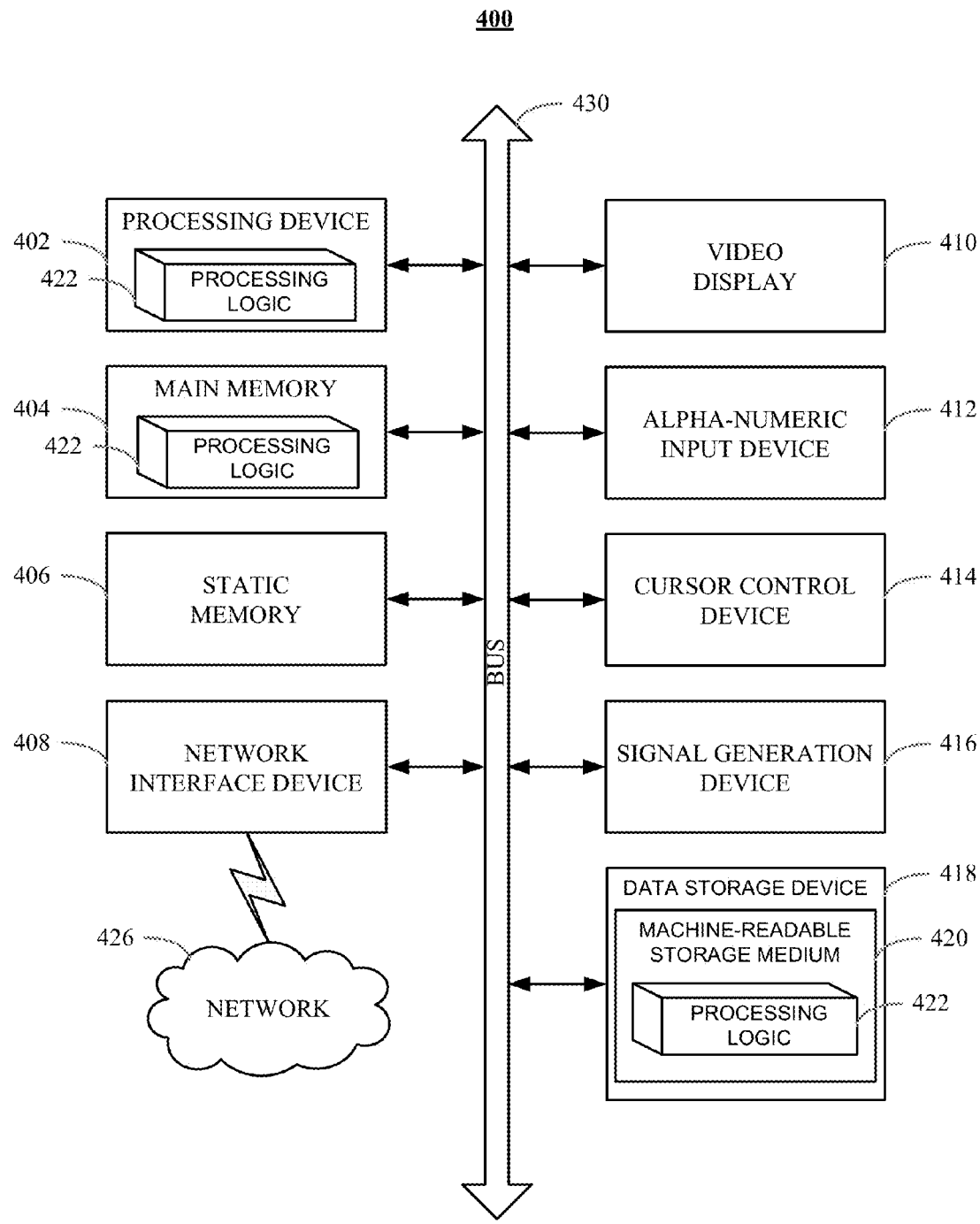
FIG. 4 illustrates a diagrammatic representation of a machine in the exemplary form of a computer system within which a set of instructions, for causing the machine to perform any one or more of the methodologies discussed herein, may be executed.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 530.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 402 is configured to execute device queue manager logic 422 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., processing logic 422) embodying any one or more of the methodologies of functions described herein. Processing logic 422 may also reside, completely or at least partially, within main memory 404 and/or within processing device 402 during execution thereof by computer system 400; main memory 404 and processing device 402 also constituting machine-readable storage media. Processing logic 422 may further be transmitted or received over a network 426 via network interface device 408.

Machine-readable storage medium 420 may also be used to store the device queue manager logic persistently. While machine-readable storage medium 420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:

receiving, by a node health monitor residing locally with a node of a plurality of nodes over a network from a cloud health monitor of a cloud controller, one or more failure policies applicable to the node, the node comprising one or more virtual machines, residing on a host machine, and the node health monitor, residing on the host machine and monitoring the health of the one or more virtual machines;

responsive to the node health monitor determining that the one or more failure policies applicable to the node is satisfied, marking, by the node health monitor, the node as failed; and reporting, by the node health monitor over the network to the cloud health monitor, at least one fault in view of the satisfied one or more failure policies applicable to the node.

2. The method of claim 1, wherein the failure policy is applied in view of a state of the node.

3. The method of claim 2, wherein the failure policy is a descriptor of system state that must be in bounds.

4. The method of claim 3, wherein the failure policy is one or more system statistics as a component for equation testing.

5. The method of claim 1, wherein the failure policy is received by the node health monitor when the node health monitor is initiated.

6. A system, comprising:

a memory;

a processing device operatively coupled to the memory, the processing device to:

receive, by a node health monitor residing locally with a node of a plurality of nodes over a network from a cloud health monitor of a cloud controller, one or more failure policies applicable to the node, the node comprising one or more virtual machines, residing on a host machine, and the node health monitor, residing on the host machine and monitoring the health of the one or more virtual machines;

responsive to the node health monitor determining that the one or more failure policies applicable to the node is satisfied:

mark, by the node health monitor, the node as failed; and report, by the node health monitor over the network to the cloud health monitor, at least one fault in view of the satisfied one or more failure policies applicable to the node.

7. The system of claim 6, wherein the failure policy is applied in view of a state of the node.

8. The system of claim 7, wherein the failure policy is a descriptor of system state that must be in bounds.

9. The system of claim 8, wherein the failure policy is one or more system statistics as a component for equation testing.

10. The system of claim 6, wherein the failure policy is received by the node health monitor when the node health monitor is initiated.

11. The system of claim 6, wherein the node is associated with a private cloud, a public cloud, or a hybrid cloud.

12. A non-transitory computer readable storage medium comprising instructions that, when executed by a processing device, cause the processing device to:

receive, by a node health monitor residing locally with a node of a plurality of nodes over a network from a cloud health monitor of a cloud controller, one or more failure policies applicable to the node, the node comprising one or more virtual machines, residing on a host machine, and the node health monitor, residing on the host machine and monitoring the health of the one or more virtual machines;

responsive to the node health monitor determining that the one or more failure policies applicable to the node is satisfied, mark, by the node health monitor, the node as failed; and report, by the node health monitor over the network to the cloud health monitor, at least one fault in view of the satisfied one or more failure policies applicable to the node.

13. The non-transitory computer readable storage medium of claim 12, wherein the failure policy is applied in view of a state of the node.

14. The non-transitory computer readable storage medium of claim 13, wherein the failure policy is a descriptor of system state that must be in bounds.

15. The non-transitory computer readable storage medium of claim 14, wherein the failure policy is a one or more system statistics as a component for equation testing.

16. The non-transitory computer readable storage medium of claim 12, wherein the failure policy is received by the node health monitor when the node health monitor is initiated.

* * * * *